C. H. THORDARSON.

INSULATING BUSHING.

APPLICATION FILED NOV. 1, 1911.

Reissued Feb. 11, 1913. 13,529.

Witnesses:

Harry S. Gaither

J. A. Burgess

Inventor:

Chester H. Thordarson

By William L. Stacy

Atty.

UNITED STATES PATENT OFFICE.

CHESTER H. THORDARSON, OF CHICAGO, ILLINOIS.

INSULATING-BUSHING.

13,529. Specification of Reissued Letters Patent. Reissued Feb. 11, 1913.

Original No. 962,726, dated June 28, 1910, Serial No. 540,756. Application for reissue filed November 1, 1911. Serial No. 658,068.

*To all whom it may concern:*

Be it known that I, CHESTER H. THORDARSON, a citizen of the United States, and a resident of the city of Chicago, county of Cook, and the State of Illinois, have invented certain new and useful Improvements in Insulating-Bushings; and I do hereby declare the following to be a full, clear, and exact description thereof, reference being made to the accompanying drawings, and to the characters of reference marked thereon, which form part of this specification.

This invention relates to a novel insulating bushing for electric wiring for insulating wires from walls, plates and the like through which the wires extend, and to means for fastening such bushing or other generally similar body or receptacle (as an electric lamp socket) to a support through which it extends.

The invention refers more specifically to an insulating bushing or other part which is adapted to extend through an opening in a wall or plate or other part on which it is supported, and provided with means for removably clamping or fastening the same to the wall, plate or other part. The body of such bushings, sockets and the like are usually made of poreclain or like relatively fragile material, and it is the purpose of my invention to provide means for fastening the bushing in place of such a nature as will avoid the forming of a screw-thread on the insulating body, and also which will avoid the strains, due to the clamping pressure of the screw-threads, being transmitted to the relatively fragile insulating body in a manner tending to break the same.

The invention is herein shown as applied to an insulating bushing for electric wires, but certain features of the invention may be equally well applied to lamp sockets which project through openings in their supports and other generally similar devices which are arranged to be fastened in place in a generally similar manner to that herein shown.

The invention consists in the matters hereinafter set forth and more particularly pointed out in the appended claims.

Figure 1:
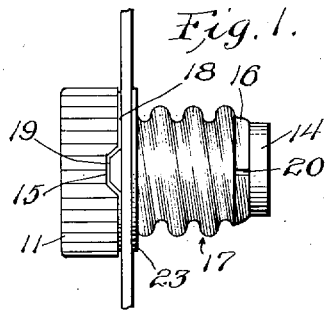
Figure 2:
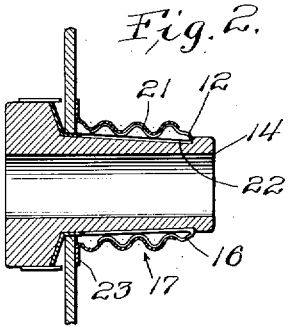
Figure 3:
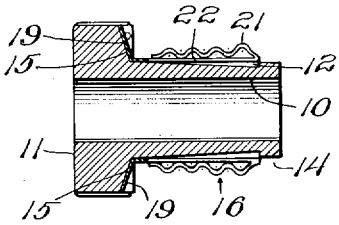
Figure 4:
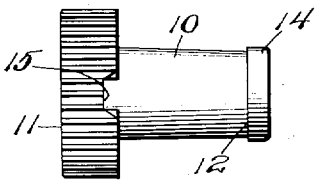
Figure 5:
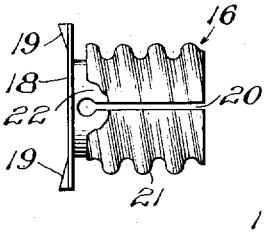
Figure 7:
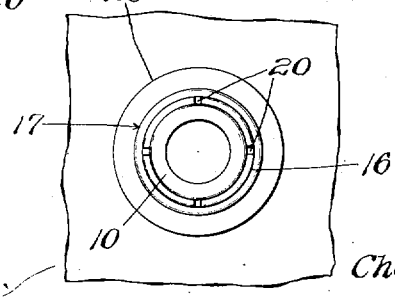
Figure 6:
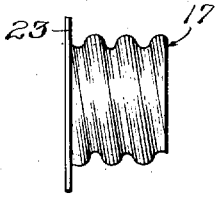

In the drawings Figure 1 is a side elevation of a bushing embodying my invention, showing the same as mounted on a plate or support through which it extends. Fig. 2 is an axial section thereof. Fig. 3 is an axial section of the bushing body and the screw-threaded sleeve mounted thereon. Fig. 4 is a side elevation of the insulating bushing body. Fig. 5 is a side elevation of the screw-threaded sleeve constituting part of the fastening means. Fig. 6 is a side elevation of the screw-threaded locking nut which coöperates with said sleeve to fasten the bushing in place. Fig. 7 is an end view of the parts, assembled as shown in Fig. 3.

As shown in the drawings, 10 designates the tubular bushing body made of any suitable insulating material, such, for instance, as porcelain. The said insulating body is provided at one end with a head 11, which is preferably formed with a roughened periphery to aid in holding the same when the screw-threaded locking means are adjusted. The bushing is provided at its end remote from the head with an annular shoulder 12, and the shank of the body is tapered inwardly from said shoulder toward the head. The extreme end 14 of the body is made of the same diameter as that of the shank near the head. The head is provided on its inner flat face, or that adjacent to the shank, with one or more notches 15 for a purpose to be hereinafter described, two diametrically opposite notches being herein shown.

Surrounding the shank of the bushing is a spring metal sleeve 16, shown as detached from the other parts in Fig. 5. It is provided with an exterior screw-thread which is adapted to receive a screw-threaded locking nut 17, shown in place in Figs. 1 and 2, and detached from the other parts in Fig. 6. The said sleeve 16 is made of a suitable spring metal, and is provided at its inner end with a flange 18 that fits the flat inner face of the head 11 of the bushing body. The flange 18 is provided with lugs 19, 19 adapted to fit into the notches 15 of the head to interlock therein or to hold the sleeve relatively fixed on the bushing body. These lugs may be formed in the flange 18 by crimping the same outwardly in the manner clearly indicated in Figs. 1, 2, 3 and 5. The sleeve is adapted to slide freely on the shank of the bushing body when assembling the parts, the shank being made exteriorly smooth. The sleeve is longitudinally split as shown at 20, 20, so that it may be contracted inwardly against the shank.

The length of the sleeve is such that when in place the outer end thereof is just inside the plane of the shoulder 12 of the bushing body. When the sleeve is contracted, therefore, on the shank end of the body, it is pressed inwardly behind the shoulder 12, as more clearly indicated in Fig. 2, whereby the sleeve is locked from axial movement on the shank of the bushing body. The split, spring sleeve is thus contracted by screwing the locking nut 17 thereover. As herein shown the screw-thread is made somewhat deeper at the outer end of the sleeve than at the inner end thereof, so that when the cylindric screw-threaded nut 17 is screw-threaded over the sleeve the sleeve is compressed inwardly to bring the end of the same behind the shoulder 12, as stated. The said shoulder, coöperating with the end of the sleeve as described, serves to lock the sleeve from endwise movement on the bushing body, so that the screw-thread carried by the metal sleeve becomes a fixed part of the bushing body. When the split sleeve is unconfined by the nut 17, the resilient members between the slits 20 spring outwardly as shown in Fig. 3 so that the sleeve may be passed freely upon and slipped over the body.

The split spring sleeve is herein shown as made of special construction to provide the exterior screw-thread thereon. As herein shown the sleeve is made of a piece of metal substantially twice as long as the final length of the sleeve, and the outer ends 21 of the portions thereof between the slit 20 are turned backwardly upon the portions 22 of the sleeve next adjacent the flange; and it is upon the backwardly turned members 21 that the screw-thread is formed. This arrangement provides for the required thickness of the threaded portion of the sleeve to permit the proper engagement therewith of the screw-threaded locking nut 17 to contract the split sleeve with its end inwardly behind the shoulder 12. So far as the broader features of the invention are concerned however, said sleeve, or its equivalent part may be otherwise made.

The locking nut 17 and the sleeve 16 may be made of sheet metal, and preferably of a metal possessing some spring or resiliency. The nut 17 is provided at its inner end with an annular radial flange 23 which opposes, and is adapted to coöperate with the flange 18 of the sleeve adjacent to the head of the bushing body to yieldingly clamp the bushing body upon the support or plate confined between said flanges.

In assembling of the parts of the bushing, the contractible, screw-threaded sleeve is first slipped endwise over the shank of the bushing body and the lugs 19 are engaged with the notches 15 of the head. Thereafter the split outer end of the screw-threaded sleeve 16 is pressed inwardly by the fingers, and the locking nut 17 is screw-threaded over the sleeve and contracts the split sleeve to bring its end behind the retaining shoulder 12. In this position of the parts it will be obvious that the screw-threaded sleeve is retained fixedly on the bushing body, so long as the nut is in place, and that the device may be handled as an article of manufacture without danger of parts becoming detached and lost. The bushing is applied to the part which supports it by removing the locking nut and inserting the shank through an opening in said support with the flange 18 of the sleeve 15 at the head of the body bearing against one side of the support; the inner side of the head or the flange engaged therewith constituting a shoulder or abutment that coöperates with the flange of the locking nut to clamp the bushing in place. The nut is then applied to the screw-threaded sleeve and turned up against the side of the support opposite to the head or flange so as to clamp the device in place with the support confined between said flange 18 of the sleeve 16 and the flange of the locking nut.

An important advantage of the construction described is that the stress or strain due to the screw-thread action of the nut 17 to clamp the bushing or other part in place is transmitted directly to and is received wholly by the screw-threaded sleeve 16 and the nut 17 and no part of the strain or stress is brought upon the insulating body itself. This is of special importance when the body is made of porcelain or like relatively fragile material, inasmuch as it has been found that the stress of the screw-threaded clamping pressure tends to and does in many instances break the body or the threads thereof. The breaking of the body obviously seriously or entirely impairs the insulating efficiency of the device. Another advantage of the construction described is that the casting of a screw-thread on the insulating body is thereby avoided. The casting of a screw-thread on porcelain or like substance is a source of considerable annoyance and expense, and I have found it to be less expensive to apply the screw-threaded sleeve to the body than to cast the thread integrally therewith.

The bushing or other body, and the screw-threaded sleeve thereon, such as shown in Fig. 3, may be screwed into a screw-threaded socket of a relatively heavy part that supports the same, as for instance, in a socket formed in a casting of an electric machine. The engagement of the screw-threaded, contractible sleeve 16 with the screw-threaded socket wall serves to contract the sleeve on the insulating body in the same manner as does the nut 17, and thereby lock the sleeve in place on the body.

It will be understood that the details of the construction illustrated may be considerably varied within the scope of my invention and that the invention is not limited to such details except as hereinafter made the subject of specific claims.

I claim as my invention—

1. An insulating bushing for electric wiring comprising a tubular body of porcelain or the like, adapted to extend through and beyond the sides of an apertured support, an exteriorly screw-threaded and interiorly smooth, flanged resilient sleeve fitted over said body with means whereby it is adapted to be locked thereon, and a screw-threaded nut surrounding and engaging over said sleeve and provided with a flange which opposes the flange of the sleeve.

2. In combination, a hollow insulating body having a portion adapted to extend through an opening in a support and beyond both sides thereof, a resilient, flanged, exteriorly screw-threaded and interiorly smooth sleeve fitted on and interlocked to said body, and a flanged locking nut engaged over the screw-threaded sleeve with its flange opposing the flange of said sleeve.

3. An insulating bushing for electric wiring comprising a headed, tubular, insulating body, a screw-threaded sleeve removably fitted to the body and having means for locking it from endwise and angular movement thereon, and a flanged, screw-threaded locking nut engaged over said sleeve and constituting part of the means for locking said sleeve on said body.

4. An insulating bushing for electric wiring comprising a headed insulating body, a split, screw-threaded sleeve adapted to be slipped endwise over the body and having means for locking it from rotation thereon and a flanged locking nut engaged over said sleeve and coöperating with means for locking the sleeve from endwise movement on the insulating body.

5. An insulating bushing for electric wiring comprising a tubular shank provided at one end with an enlarged head and at its other end with a narrow shoulder, a split, screw-threaded sleeve removably fitted over the shank and having means for preventing it from turning thereon, and a screw-threaded nut engaged over the screw-threaded sleeve and arranged to press the split end of the sleeve behind said shoulder to lock the sleeve from endwise movement on the shank.

6. An insulating bushing for electric wiring comprising a headed, tubular, insulating body, a split, screw-threaded sleeve removably fitted over the body and provided with a flange having interlocking engagement with the head of the body, the body provided at its end remote from the head with a narrow shoulder adapted to be engaged by the end of said sleeve, and a screw-threaded locking nut engaged over said sleeve and arranged to contract the split sleeve with its end behind said shoulder.

7. An insulating bushing for electric wiring comprising a tubular, insulating body provided at one end with an enlarged head and at its other end with a shoulder, a split, screw-threaded sleeve removably fitted over the body and provided at one end with a flange arranged to interlock with said head and adapted to be contracted at its other end behind said shoulder, and a screw-threaded locking nut engaged over the screw-threaded sleeve to so contract the sleeve.

8. An insulating bushing for electric wiring comprising a tubular, insulating body provided at one end with a head and at its other end with a shoulder and tapered from the head to the shoulder, a split, screw-threaded sleeve removably fitted over the body and interlocked from rotation thereon and a screw thread locking nut for contracting the sleeve upon the tapered portion of the body, with its split end behind said shoulder to lock it from endwise movement on the body.

9. In combination, a body having at one end an enlarged head or shoulder and at the other end a narrower shoulder, a sleeve removably fitted thereover and having means for locking it from rotation thereon, the sleeve comprising a smooth inner wall portion and an outer wall, the outer wall being screw-threaded and the sleeve being longitudinally slitted through both walls, and a screw-thread locking nut engaging over the screw-threaded sleeve and arranged to contract the split sleeve end behind said narrower shoulder.

10. In combination, a shouldered insulating body, a split sleeve removably fitted thereon and having means for locking it from angular and endwise movement thereon, the sleeve comprising an inner portion and an outer portion, the latter consisting of the split end portions of the sleeve turned backwardly over the inner portion and provided with a screw-thread, and a screw-threaded locking nut engaged over the sleeve.

11. In combination, an insulating, exteriorly non-screw-threaded body having a portion adapted to extend through an opening in a support, a flanged, exteriorly screw-threaded sleeve fitted on and interlocked to said body, and a screw-threaded locking nut engaged over said sleeve and opposing the flange of the sleeve.

12. The combination with an insulating body having a shank portion adapted to extend through an opening in a support and having at one end an enlarged head or shoulder to bear against one side of the support, and at its other end a narrower shoulder, a split screw-threaded sleeve removably fitted over said shank and interlocked non-rotatively on the body, and a screw-threaded locking nut engaged over said sleeve and arranged to contract the split end of the sleeve behind said shoulder to hold the sleeve from endwise movement on the body.

13. The combination with an insulating body having a shank portion adapted to extend through an opening in a support and having at one end an enlarged head or shoulder to bear against one side of the support, and at its other end a narrower shoulder, a split, screw-threaded sleeve removably fitted over said shank and formed with a flange which fits against and interlocks with said enlarged shoulder, and a screw-threaded locking nut engaged over said sleeve and arranged to contract the split end of the sleeve behind said narrower shoulder, and provided with a flange which opposes said sleeve flange.

14. The combination with an insulating body, of a contractible spring screw-threaded sleeve removably fitted thereto and arranged to be locked on said body when screwed into a screw-threaded shell or socket.

15. The combination with an insulating body formed with an elongated portion having at one end an enlarged shoulder and at its other end a narrow shoulder, of a screw-threaded contractible spring sleeve removably fitted over said elongated portion and non-rotatively fitted thereto and adapted to be contracted with its end behind said narrower shoulder.

16. An insulating bushing for electric wiring comprising a tubular body of insulating material embracing a shank adapted to extend through an apertured support and a head at one end of the shank adapted to oppose one side of the support, an exteriorly screw-threaded and interiorly smooth sleeve fitted over said shank and interlocked therewith and having a flange to engage said head and a screw-threaded nut fitted over said sleeve with one end opposing the flange of the sleeve.

In testimony, that I claim the foregoing as my invention I affix my signature in the presence of two witnesses, this 30th day of October A. D., 1911.

CHESTER H. THORDARSON.

Witnesses:
WILLIAM L. HALL,
GERTRUDE E. DOWLE.